United States Patent
Mijares et al.

(10) Patent No.: US 6,683,881 B1
(45) Date of Patent: Jan. 27, 2004

(54) INTERFACE BETWEEN AN SS7 GATEWAY AND AN IP NETWORK

(75) Inventors: Carlos Mijares, Saltillo (MX); Dave Larson, Cary, NC (US); Hans Mo, Cary, NC (US); Olof Lindstrom, Cary, NC (US); Michael Dalbo, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/322,335

(22) Filed: May 28, 1999

(51) Int. Cl.[7] .................. H04L 12/66; H04L 12/56; H04L 12/26
(52) U.S. Cl. .............. 370/401; 370/467; 370/469; 370/352; 370/354; 370/355; 340/3.1
(58) Field of Search .............. 370/236.1, 236.2, 370/315, 321, 328, 336, 338, 345, 349, 352, 354, 355, 356, 389, 392, 395.5, 400, 401, 465, 466, 467, 469, 474, 496; 340/3.1

(56) References Cited

U.S. PATENT DOCUMENTS

| | | | |
|---|---|---|---|
| 5,793,771 A | | 8/1998 | Darland et al. |
| 5,923,659 A | * | 7/1999 | Curry et al. ............ 370/401 |
| 5,943,619 A | * | 8/1999 | Coyne et al. ........... 455/433 |
| 6,047,194 A | * | 4/2000 | Andersson ............. 455/466 |
| 6,073,015 A | * | 6/2000 | Berggren et al. ....... 455/432 |
| H1895 H | * | 10/2000 | Hoffpauir et al. ...... 455/433 |
| 6,137,806 A | * | 10/2000 | Martinez ............... 370/428 |
| 6,178,181 B1 | * | 1/2001 | Glitho ................. 370/467 |
| 6,324,183 B1 | * | 11/2001 | Miller et al. .......... 370/467 |
| 6,327,267 B1 | * | 12/2001 | Valentine et al. ....... 370/466 |
| 6,353,607 B1 | * | 3/2002 | Valentine et al. ....... 370/349 |
| 6,393,014 B1 | * | 5/2002 | Daly et al. ............ 370/352 |
| 6,411,632 B2 | * | 6/2002 | Lindgren et al. ....... 370/466 |
| 6,427,071 B1 | * | 7/2002 | Adams et al. .......... 455/403 |
| 6,490,252 B1 | * | 12/2002 | Riggan et al. .......... 370/237 |

FOREIGN PATENT DOCUMENTS

WO    WO 99/14910    3/1999

OTHER PUBLICATIONS

Modarressi, Abdi R. and Skoog, Ronald A., "An Overview of Signaling System No. 7," Proceedings of the IEEE, vol. 80, No. 4, Apr. 1992, pp.590–606.

* cited by examiner

Primary Examiner—Hassan Kizou
Assistant Examiner—Ahmed Elallam
(74) Attorney, Agent, or Firm—Coats & Bennett, P.L.L.C.

(57) ABSTRACT

An interface between an SS7 gateway and an IP network allows application layer data, such as MAP and TCAP messages, to be transported unchanged through the interface. The invention also provides a protocol for transporting MAP and TCAP messages that eliminates the need for SS7 protocols, and in particular, eliminates the need to implement the Signaling Connection Control Part (SCCP). The interface is particularly useful for connecting a private wireless office system to an SS7 network to allow roaming between the private wireless office telephone system and the PLMN.

45 Claims, 7 Drawing Sheets

| MESSAGE CODE | LENGTH | INFORMATION UNIT |
|---|---|---|

FIG. 7

INTERFACE BETWEEN AN SS7 GATEWAY AND AN IP NETWORK

FIELD OF THE INVENTION

The present invention relates generally to signaling protocols used in telecommunications networks, and more particularly, to an interface between a gateway to an SS7 telecommunications network, such as the Public Land Mobile Network (PLMN), and an Internet Protocol (IP) telecommunications network, such as a private wireless office network.

BACKGROUND OF THE INVENTION

The Public Land Mobile Network

In a cellular communication network, a geographical area or calling area is divided into smaller coverage zones called cells. Each cell is served by a base station that communicates with mobile phones within that particular cell. The base stations are linked to a Mobile Services Switching Center (MSC) that in turn is connected to other MSCs as well as the Public Switched Telephone Network (PSTN).

Many cellular networks are interconnected to form the Public Land Mobile Network (PLMN). The area serviced by a particular cellular network in the PLMN is referred to as a calling area. The interconnection of many different cellular networks allows mobile subscribers to maintain service while "roaming" outside the service area of their home provider. The MSC is responsible for connecting calls that originate or terminate in the PLMN.

To carry out the business of requesting services, connecting calls, and sharing information that is needed to provide telecommunications services to mobile subscribers, the MSCs in the cellular network must exchange information with one another. In modern cellular communication systems, a signaling network provides the communication link between MSCs in a cellular network. This signaling network is used by the MSCs to exchange information needed to carry out the business of connecting and disconnecting voice and data circuits and providing other services. For example, the signaling network is used by the MSC to request connection to a voice or data circuit controlled by another MSC. The signaling network is also used to provide services, such as roaming, and to invoke advanced features of the network, such as automatic callback. The signaling network is separate from the voice network and is used solely for the purpose of communicating messages between nodes in the network necessary to the business of connecting calls and maintaining the network. An example of a signaling network is the SS7 network. SS7 is an international standard network signaling protocol that allows common channel signaling between entities within a network.

In order to permit the orderly exchange of information, nodes of a network must agree to a specific communications protocol. The protocol must be strictly followed by each node participating in a communication session to properly deliver data between the nodes. In the PLMN, that protocol is the SS7 protocol. SS7 is a message-based, packet switching protocol that provides connectionless services. In the SS7 network, an entity requests services from another network entity by sending a message without establishing a physical connection to the destination node. These messages travel from node to node over the network from the originating node to the destination node in a envelope called a packet. An important feature of the SS7 protocol is its layered architecture. The functions of the protocol are divided into layers. Each message transmitted will contain many layers of information. When a message is sent, it is passed down through the various layers of the protocol stack at the originating node, over the physical medium to the destination node, and back up the protocol stack at the destination node. As the message travels down the protocol stack, each layer adds information in a header to the message that is needed by the protocols at that layer. As the message travels up the protocol stack at the destination node, the header information is stripped off at each layer. Thus, each layer acts as an envelope to transport messages generated by the layer above.

Two important protocols used in cellular communications networks are the Mobile Application Protocol (MAP) and the Transaction Capabilities Control Protocol (TCAP). The MAP protocol is an extension of the SS7 protocol adapted for use in cellular networks. One of the main functions of the MAP protocol is to provide seamless roaming between cellular networks so that cellular subscribers do not have to pre-arrange for roaming services. The MAP protocol defines the messages and transactions for exchanging subscriber information between nodes that is needed to implement seamless roaming services. As a result, a cellular subscriber can travel from one calling area to another without pre-arrangement of loss of service. The MAP protocol makes roaming transparent to the user.

The MAP protocol relies on the TCAP protocol to retrieve subscriber information from network databases. TCAP is an SS7 protocol that is used to provide access to network databases. In the intelligent network, TCAP protocol is also used by one node to invoke features, such as automatic callback, at another node.

Private Wireless Office Telephone Systems

In recent years, there has been much interest in building private wireless office telephone systems (WOTS) by corporations or other large entities. Private wireless office telephone systems employ many concepts and features used by cellular networks and may be thought of as a scaled down cellular network. A plurality of micro base stations are positioned throughout the office to provide radio coverage within the office for mobile telephones. These base stations are connected to a switching center that is similar to the MSC in a cellular network. The switching center provides connection to the PSTN to allow users in the private wireless office system to communicate with the PSTN.

The main advantage of a WOTS is that it allows customers to use wireless telephones in an office or other localized area rather than a desk phone with a fixed connection to the telephone system. This allows customers to have mobility within the office yet remain accessible by phone.

In order to fully realize the potential of the wireless office telephone system, it is desirable to also interface the WOTS with the PLMN. Interfacing with the PLMN allows users of the WOTS to use a single mobile phone in both networks. That is, a user of the private wireless office telephone system could use the same mobile phone when "roaming" in the PLMN. To make roaming in the PLMN possible, the private wireless office telephone system must be able to communicate with the PLMN. Thus, the private wireless office telephone system must implement the application layer protocols already in use in the PLMN. Those protocols include the Mobile Application Protocol (MAP) and the Transaction Application Control Protocol (TCAP).

In an SS7 network, the TCAP protocol relies on the services of a transport protocol called the Signaling Connection Control Part (SCCP) to deliver messages over the network. The SCCP layer provides the routing information needed to deliver messages over the SS7 network. Information contained in the SCCP layer includes the origination and destination addresses that are used to route messages through the network or series of networks.

Existing implementations of the private wireless office telephone systems also use the SCCP protocols for transporting messages over the private wireless office network. This means that the nodes in the wireless office telephone system must be assigned SS7 addresses and participate in SS7 message management at the SCCP layer. The SCCP layer adds additional signaling overhead that is not needed in wireless office telephone systems that use the TCP/IP protocols for addressing and routing of messages. In TCP/IP networks, addressing is managed by the IP layer. The TCP layer is also capable of providing transport services similar to SCCP. Eliminating support for the SCCP protocols would greatly simplify the private wireless office system and eliminate redundancy in the existing protocols. Therefore, there is a need for a protocol and interface that allows TCAP and MAP messages to be transported over an existing TCP/IP network without the need to implement the SCCP or lower level SS7 protocols in the private wireless office network.

SUMMARY OF THE INVENTION

The present invention relates to an interface between an SS7 gateway and an IP network. The interface allows messages addressed using the IP protocol to be transmitted via said interface to an SS7 gateway and then formatted for transmission over said SS7 network. The invention is particularly useful for connecting a private wireless office system to an SS7 network to allow roaming between the private wireless office telephone system and the PLMN. The invention allows application layer data, such as MAP and TCAP messages, to be transported unchanged through the interface. The invention also provides a protocol for transporting MAP and TCAP messages that eliminates the need for SS7 protocols, and in particular, eliminates the need to implement the Signaling Connection Control Part (SCCP).

According to the present invention, mobile application messages (MAM) are transported through the interface to the SS7 gateway using a protocol called the Private Wireless Office Protocol (PWOP). MAM messages are encapsulated in a PWOP layer having address information elements identifying the called party and the calling party. In messages originating in the IP network, the calling party address is populated with the IP address of the originating host in the IP network. The calling party address is translated by the interface into a SS7 address. The message is also reformatted by the interface to render it suitable for transmission over the SS7 network. Messages originating from a node in the SS7 network are received by the SS7 gateway and transmitted over the interface to a host in the IP network. Since the hosts in the IP network are not addressed using a SS7 address, the interface must translate the called party address from a SS7 address to an IP address identifying the destination host in the IP network. To perform this conversion, the interface uses a database that stores the IP addresses for hosts in the IP network along with a corresponding SS7 address. The interface replaces the SS7 calling party address with the corresponding IP address retrieved from the database and reformats the message for transmission over the IP network.

The PWOP protocol also defines procedures for establishing a communication session between the SS7 gateway and a host in the IP network. Those procedures include the session management procedures and link supervision procedures. The session management procedures are used to open and close communication sessions, and to configure the IP host for communication with the SS7 gateway. The link supervision procedures are used to monitor the link between the SS7 gateway and the IP network and to reestablish the link in the event that a problem arises.

The present invention provides a means for using IP to transport mobile application messages, such as MAP and TCAP messages, without intervening SS7 protocol layers. One of the benefits of the invention is that it provides a relatively simple yet robust transport protocol that eliminates the need for hosts in the IP network to have any knowledge of SS7 protocols or to participate in SS7 message management. The present invention also allows current MAP/TCAP protocols to be used within the IP network.

BRIEF DESCRIPTION OF THE DRAWINGS

FIG. 7 is a schematic diagram illustrating the message format used by the PWOP protocol

DETAILED DESCRIPTION OF THE INVENTION

Figure 1:
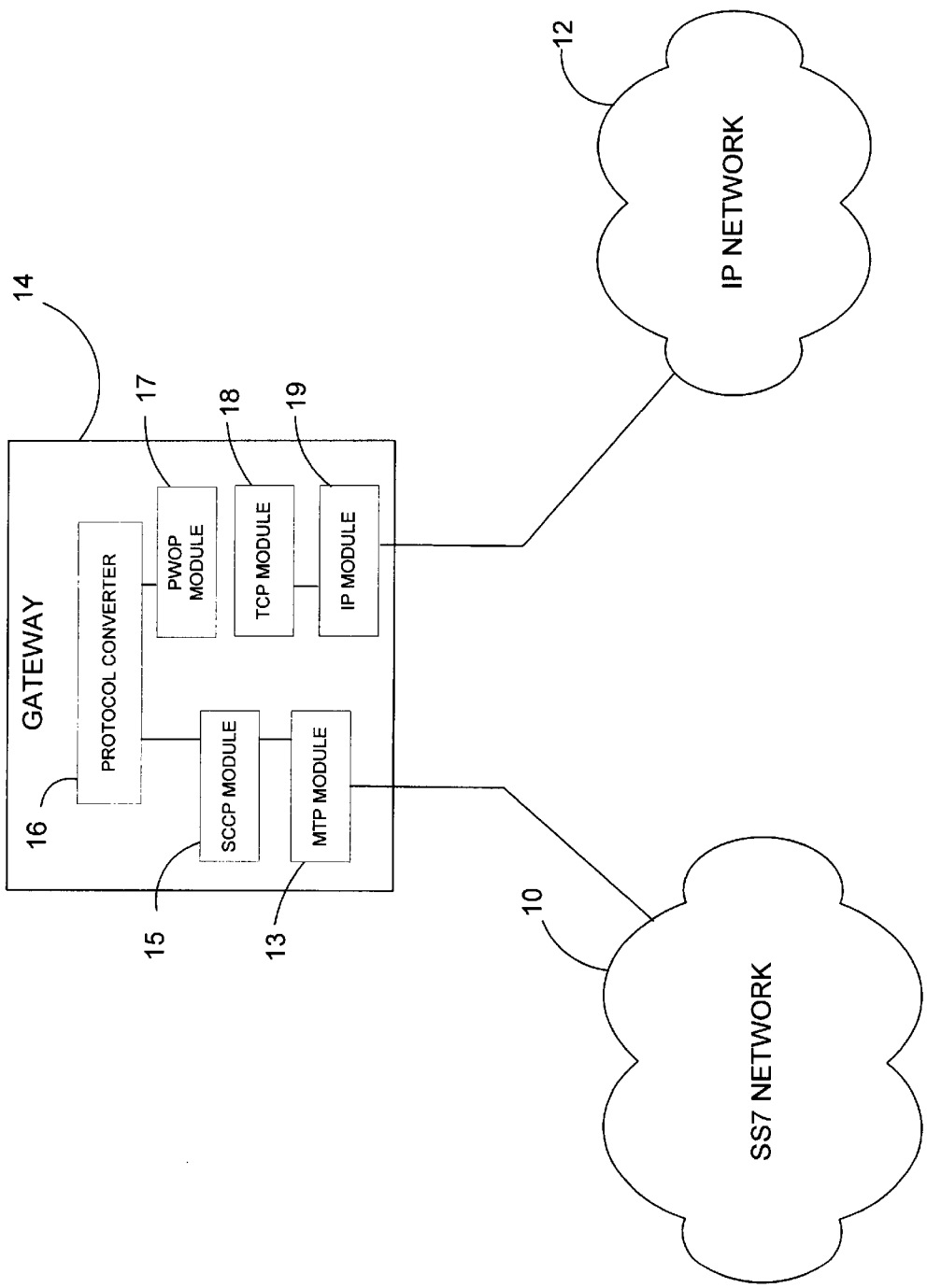
FIG. 1 is a schematic diagram illustrating an SS7 network and IP network interconnected by a gateway.

FIG. 1 is a schematic diagram showing an SS7 network 10 and an IP network 12 connected by a gateway. Gateway includes an SCCP module 15 and MTP module 13 for communicating with nodes in the SS7 network. Gateway 14 further includes a PWOP module 17, TCP module 18, and IP module 19 for communicating with nodes on the IP network 12. An SS7-IP protocol converter 16 for reformatting messages transmitted between the SS7 and IP networks sits between the SCCP module 15 and PWOP module 17. The gateway 14 allows messages originating in the IP network 12 to be transmitted via the gateway 14 to a node in the SS7 network 10. Similarly, messages originating in the SS7 network 10 can be transmitted via the gateway 14 to a host on the IP network 12. Messages originating in the IP network 12 are converted into SS7 messages for transport over the SS7 network 10. Similarly, messages originating in the SS7 network 10 are converted into IP messages suitable for transmission over the IP network 12.

The invention provides an interface between the gateway 14 and the IP network 12. This interface is referred to herein as the gateway interface. One useful application of the invention is to connect a private wireless office telephone system that uses TCP/IP for message transport with a cellular communication network that uses the SS7 protocols. One aspect of the invention is to define protocols that enable application layer data contained in MAP and TCAP messages typically used in cellular networks employing SS7 to be transported unchanged over the interface to the IP network. The invention also comprises an protocol converter 16 that reformats messages transmitted between the SS7 and IP networks via the gateway 14.

To place the invention in context, the architecture and basic operation of a cellular communication network and private wireless office telephone system will be described. The problem of interfacing these dissimilar networks will then be described. Finally, the interface provided by the present invention that solves this problem will be described.

DESCRIPTION AND BASIC OPERATION OF PLMN

Figure 2:
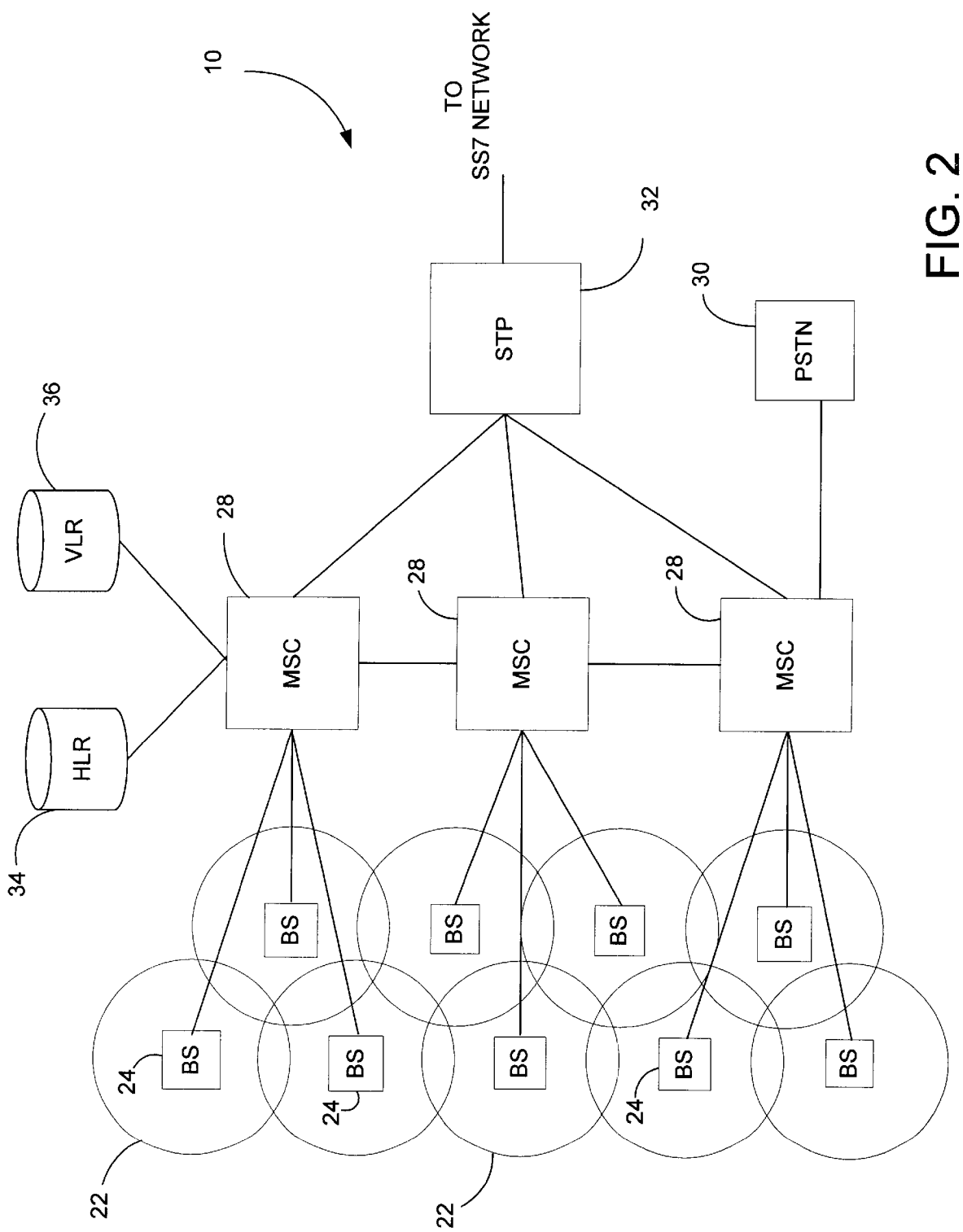
FIG. 2 is a schematic diagram of a cellular communication network.

FIG. 2 is a schematic diagram of a Public Land Mobile Network PLMN. From a user's standpoint, the PLMN appears to be a single homogenous network. In fact, the PLMN is actually a collection of many interconnected cellular communication networks operated by many different service providers.

A fundamental concept of cellular communication networks is the division of the service area into a plurality of cells. Each cell 22 is served by a base station 24 that communicates over RF channels with mobile stations within its assigned cell 22. The base stations 24 are connected to mobile services switching centers (MSCs) 28 which in turn are connected to the Public Switched Telephone Network (PSTN) 30. Each cellular network in the PLMN will typically have many MSCs 28. The MSCs 28 are connected via Signal Transfer Points (STPs) 32 to the SS7 network. Also, the MSCs 28 in a particular network are connected via gateway STPs to MSCs 28 in other networks.

One function of the MSCs 28 is to connect calls to or from mobile telephones in the network. When a call is placed by a mobile telephone to a number in the PSTN 30, the MSC 28 connects the call to PSTN 30. When a call to a mobile telephone is received by an MSC 28, the MSC 28 must be able to connect the call to the mobile telephone addressed by the call. In order to connect calls to a mobile telephone, the MSC 28 must know the location of the mobile telephone in the PLMN so that calls can be forwarded to the appropriate MSC 28 for routing to the mobile telephone.

Information concerning the whereabouts of each mobile telephone is stored in databases that are centrally located in the network. Each service provider will typically maintain its own database containing subscriber information which is shared with other networks in the PLMN. These databases include the Home Location Register (HLR) 34 and the Visitor Location Register (VLR) 36.

The HLR 34 is used to store information concerning subscribers to a cellular network. This information typically includes the user's name and address for billing purposes, the serial number of the user's mobile station, and the services to which the user is entitled to receive. In addition, the current location of the subscriber is stored in the HLR 34 for retrieval by an MSC 28 to use in routing calls to the subscriber. The mobile unit registers with the servicing MSC 28 when it is powered on and at periodic intervals so that the servicing MSC 28 can keep track of the location of the mobile unit. The mobile unit also registers when it travels between two different service areas (areas served by different MSCs). As part of this registration procedure, the mobile unit transmits its Mobile Identification Number (MIN) to the MSC 28. The MSC 28 uses the MIN to determine which HLR 34 to access. When the mobile unit registers with MSC 28, the servicing MSC 28 updates the HLR 34 with the current location of the mobile station. When an MSC 28 receives a call addressed to a subscriber that is not currently in that MSC's 28 service area, the MSC 28 will query the HLR 34 for the subscriber's location so that the call can be forwarded to the MSC 28 currently servicing the subscriber.

The VLR 36 is used to store information about users that are not in their home service area. When subscribers roam outside of their home service area, the VLR 36 in the area being visited must keep track of the subscriber's location and be able to verify the Mobile Identification Number (MIN) of the mobile telephone. The VLR 36 in the area being visited queries the HLR 34 in the subscriber's home service area to authenticate the subscriber and determine the services to which the subscriber is entitled. Information concerning the user is stored in the VLR 36 as long as the subscriber remains in the service area. The VLR 36 also stores the current location of the subscriber. The subscriber's current location is also communicated back to the home HLR 34 so that the home network will know how to forward calls addressed to the subscriber who is currently outside of the home network.

Signaling In The PLMN

In order to carry out the business of connecting calls and providing advanced telecommunications services, the MSCs 28 in a cellular communication system must be able to exchange messages with other MSCs 28. A signaling network is used to transmit such messages between MSCs 28. A signaling network typically comprises many nodes called signaling points. The messages are routed from node to node over the network from the originating node in the network to the final destination node.

Figure 4:
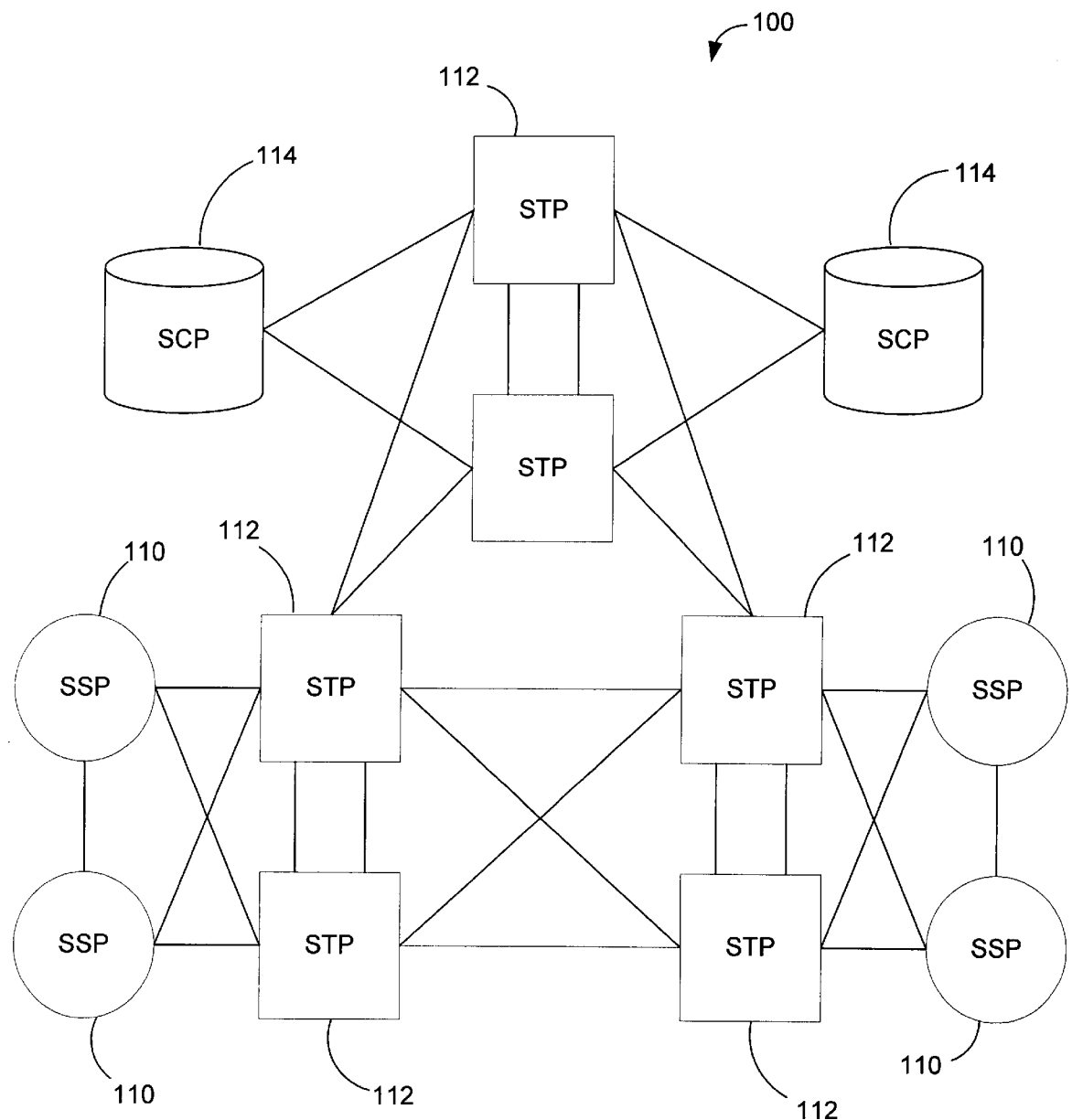
FIG. 4 is a block diagram of an SS7 signaling network.

Cellular communication networks use an SS7 signaling network. A schematic diagram of an SS7 signaling network is shown in FIG. 4. The SS7 network is indicated generally by the numeral 100. There are three basic types of signaling points in an SS7 network—the Service Switching Point (SSP) 110, the Signal Transfer Point (STP) 112, and the Service Control Point (SCP) 114. The SSP 110 is used to provide access to the network. An SSP 110 is typically an end office in a telecommunications network. For example, a local exchange in the Plain Old Telephone System (POTS) is a SSP 110. In a cellular network, the MSC 28 is a SSP. STPs 112 are used to transfer messages to other signaling points. Typically, the STP 112 serves simply as a relay between the origination and destination nodes in a network. An STP 112 does not typically originate messages, nor is the STP 112 typically the final destination of a message. STPs 112 are used not only to connect nodes within a single network, but also to connect networks. An STP 112 that connects two networks is referred to herein as a gateway STP. An SCP 114 is used to provide access to databases. Many of the features and services provided by modern telecommunications services rely on information contained in databases. For example, in the Plain Old Telephone System (POTS), databases are used to store calling card information. In the PLMN, databases are used to store information about mobile subscribers, such as the subscribers current location. The SCP 114 provides an interface to these databases.

In order to permit the orderly exchange of information, nodes of a network must agree to a specific communications protocol. The protocol must be strictly followed by each node to properly deliver data over the network. In the PLMN, that protocol is the messaged-based SS7 protocol. In the SS7 network, an entity residing at one node requests services from another network entity at another node by sending a message over the network. These messages travel from one node to another independent of the voice or data they pertain to in a envelope called a packet.

Figure 5:
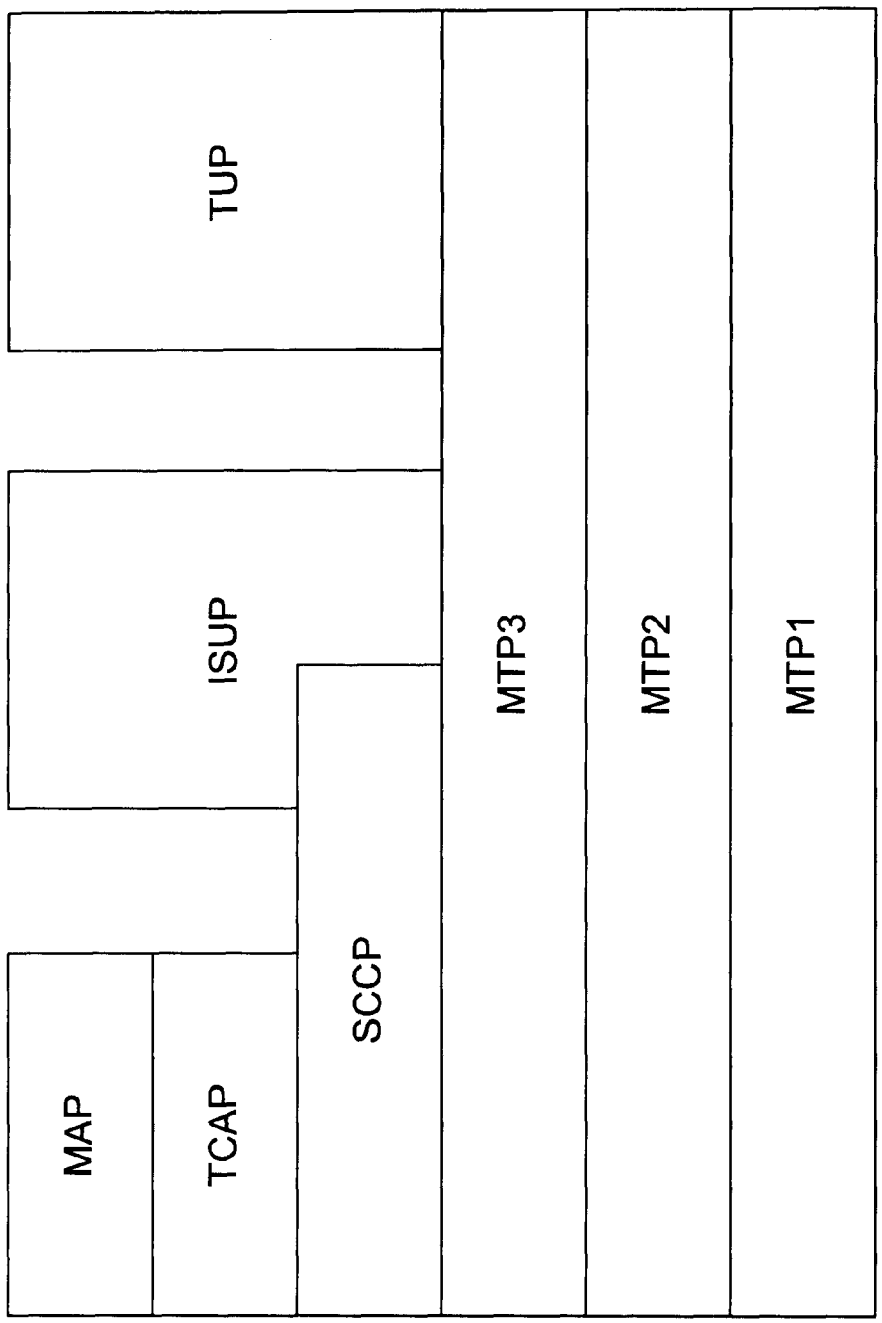
FIG. 5 is a schematic diagram showing the SS7 protocol model for an SS7 signaling network.

FIG. 5 is a block diagram illustrating the various protocols implemented in an SS7 signaling system. SS7 is actually a set of communication protocols that allow applications or processes to communicate with one another over a network. A central feature of the SS7 Reference Model is the concept of layers. The functions that need to be performed by the communications protocols are assigned to the various layers of the Reference Model. To perform those functions, a set of protocols is defined at each layer of the Reference Model. Thus, each layer of the Reference Model represents a particular networking process with its own protocols, functions, and conventions. One benefit of this layered architecture is that the protocols at each layer can be isolated to a particular software subsystem that can be designed, tested, and implemented without affecting the networking processes in other layers.

As shown in FIG. 5, the SS7 protocol stack includes a Message Transfer Part (MTP) and a User Part. The Message Transfer Part comprises three layers which correspond to the physical layer, the data link layer, and the network layer of the OSI Reference Model. Layer 1 is responsible for converting data signals into a bit stream suitable for transmission over the network. Layer 2 is responsible for delivery of messages over a signaling link between two adjacent signaling points or nodes in the network. Functions performed at this level include error detection and correction, and sequencing of data that has been broken up for transmission over the network. Layer 3 performs several functions including message discrimination, message distribution, message routing, and network management. Message discrimination determines to whom a message is addressed. If the message is addressed to the local node the message is passed to message distribution. If the message is not addressed to the local node, it is passed to message routing. Message distribution determines the user part to which the message is addressed, and routes the message to the designated user part. Message routing determines which link to use to transmit the message and sends the message back to level two for transmission on the designated link. The network layer also performs network management functions. These functions are not material to the invention and are not described herein. The MTP is described in ANSI Publication T1.111.

The User Part comes in several different varieties. Examples of User Parts include the Telephone User Part (TUP) for basic telephone services, and the ISDN User Part (ISUP) for combined voice and data services. These user parts uses the Message Transfer Part (MTP) for to provide connection-less but sequenced transport of application data over the network. The TUP and ISUP protocols are not material to the invention. The ISUP protocol is described in ANSI Publications T1.113. The TUP protocol is described in the ITU-TS documents Q.721–Q.725.

To provide access to databases within the network, the Transaction Control Application Part (TCAP) and Signaling Connection Control Part (SCCP) are used. As previously described, TCAP supports the functions required to connect to an network database, perform a query of the database, and retrieve information from the database. An application entity in the network uses TCAP messages to communicate with the database. TCAP is also used to provide access to features or services at a remote site. An application can invoke a feature at a remote site, such as automatic call back, by sending a TCAP message to the remote entity. The TCAP protocols are described in ANSI Publications T1.114.

SCCP is the protocol used to transport TCAP messages over an SS7 network. SCCP provides end-to-end routing of TCAP messages over the network. The SCCP layer contains addressing data necessary to deliver application data to the specified destination. This addressing information is used at each signaling point in the SS7 network to determine how the message should be routed. The addressing information required by the SCCP protocols include the calling party address and the called party address. The calling party and called party addresses can be a point code and subsystem number identifying a particular node in the network as the destination. Global title digits can also be used for routing of messages. When global title digits are used, the global title digits must eventually be translated into a point code and subsystem number to route the message to the final destination. The process of translating global title digits is called global title translation.

In the SS7 model, communications take place vertically as requests for services are passed from one layer to another. As the message is passed down through the protocol stack, each layer adds the information required by its protocols to the message in the form of a header. The information contained in the headers is stripped off as the message passes upwardly through the protocol stack. Thus, a message at a given layer serves as an envelope for transporting the message passed to it from the layer above. The layered messages is an important feature in many protocols, including the SS7 protocol.

TCAP and MAP Protocols

The Mobile Application Protocol (MAP) and Transaction Control Applications Protocol (TCAP) are protocols used in telecommunications networks. These protocols are application layer protocols used to provide roaming services to subscribers. The Mobile Application Part (MAP) is a relatively new protocol used in cellular networks. The purpose of this protocol is to provide a mechanism by which cellular subscriber information may be passed from one cellular network to another. The MAP protocol defines the messages and transactions that are necessary to register and cancel registrations in various databases. For example, the MAP information elements include information such as the mobile identification number (MIN) and the serial number of the cellular telephone. This information is used, for example, by the ANSI 41 protocol to register and cancel registrations. MAP relies on TCAP and SCCP for transport over the SS7 network.

The TCAP protocol is used for two purposes: accessing remote databases and invoking features in remote switches. The TCAP protocol provides a means for the reliable transfer of data from one application at one node in the network to another application within another network entity. One of the first uses of TCAP was 800 number translation. An 800 number cannot be routed through a telephone network because the "800" area code does not specify any particular exchange. Therefore, the 800 number must be converted into a routing number. This routing number is provided by a database that is located centrally within the telecommunications network. The TCAP protocol provides the parameters and services needed to query this database. In cellular networks, TCAP is the protocol used to access the home location register (HLR 34), and visitor location register (VLR 36).

In addition to providing database access, the TCAP protocol is used to allow an application entity in the network to communicate with other application entities. In the Intelligent Network, TCAP is the protocol that will be used to invoke features in remote switches. For example, one feature of the Intelligent Network is automatic callback. In this feature, when a subscriber dials a busy number, the subscriber can enter in a feature code and hang-up. When the dialed number becomes available, the local exchange notifies the caller's local switch by sending a TCAP message. The TCAP message allows the local switch to ring the phone of the caller. This is just one example of how the TCAP protocol is used by one network entity to invoke features or services of another network entity.

SCCP is the protocol used in cellular networks to transport MAP and TCAP messages and other application layer data. This protocol provides end to end routing of messages through the network. In order to route messages over the signaling network, individual nodes in the network are assigned unique physical addresses called point codes. An application or other entity residing in a particular node also has a logical address called the SSN. For example, databases in the cellular network are assigned an SSN. Messages transmitted over the network are addressed using the point code and SSN. When a node in the network receives a message, it examines the address information contained in the message to determine if the message is addressed to that node. This process is known as message discrimination. The physical address is used for message discrimination and is contained in the SCCP layer. If the message is addressed to the local node, then the local node determines the resident entity at the local node to which the message is addressed. This process is called message distribution. The logical address is used for message distribution. If the message is not addressed to the local node, then the local node determines which link to use in routing the message. This process is called message routing. Message discrimination, message distribution, and message routing are normally layer 3 functions in a cellular network but use address information contained in the SCCP layer.

In large networks, it is not practical to store routing information in a node for all possible nodes to which a message may be addresses. Therefore, messages can also be routed using a number called the global title number. The global title number is typically the digits dialed by a caller. A signaling point can look at a portion of the global title number, such as the area code, and forward the message towards the destination node without actually knowing the final destination or address. Another node may then look at the exchange prefix and forward the message to a node adjacent the local exchange servicing the called party. Finally, the adjacent node can translate the global title number into a point code and SSN for routing to the final designation.

DESCRIPTION AND BASIC OPERATION OF WIRELESS OFFICE TELEPHONE SYSTEM

Figure 3:
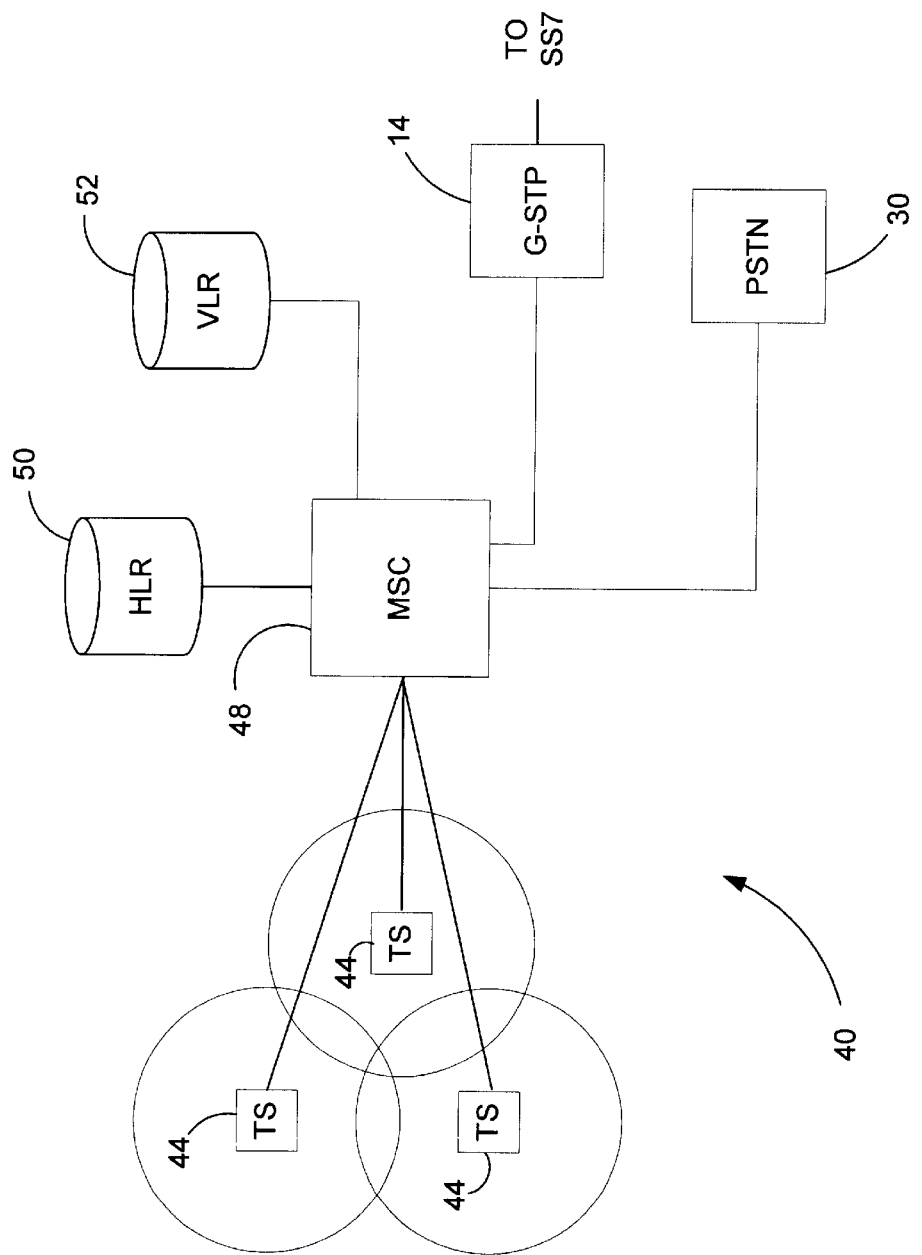
FIG. 3 a schematic diagram of a private wireless office telephone system.

FIG. 3 is a block diagram of a private wireless office telephone system (WOTS) 40. The design of the WOTS 40 is similar to a conventional cellular network described above. The WOTS 40 comprises one or more mobile services switching center MSCs 48, one or more transceiver stations 44, a Home Location Register 50, and a Visitor Location Register 52. The transceiver stations 44 communicate with mobile wireless telephones within the network 40 over radio frequency channels. When a call is addressed to one of the mobile wireless telephones, the MSC 48 routes the call to the appropriate transceiver station 44 which in turn transmits the signal to the mobile telephone.

The WOTS 40 uses a TCP/IP network for transmission of signaling messages between nodes. IP addressing is simpler to implement and less costly than SS7 addressing typically used in cellular communication networks. Each node in the network 30 is assigned a IP address that is used to route signals to the appropriate destination. The Transaction Control Protocol (TCP) is used for message transport. The use of TCP/IP protocols is relatively simple to implement and is well-known in the art.

The TCP/IP protocols used in the present invention eliminate the need for SS7 addressing on the IP side of the gateway. The TCP/IP protocols also provide transport services, thereby eliminating the need to use the SCCP protocols or lower layer SS7 protocols. Consequently, the need to support the SCCP layer of the SS7 protocol and the need for nodes on the IP side of the gateway to participate in SS7 message management is eliminated.

The Interface Problem

Because WOTS does not implement the SCCP protocol or other lower layer SS7 protocols, messages formatted for transmission over the WOTS network cannot be routed over an SS7 network. Similarly, the point codes, SSN, and global title number used in the SS7 network for routing of messages have no meaning within the IP network. Therefore, an interface is needed to provide access to the SS7 network and to convert messages transmitted over the interface into the format used on the destination side of the interface.

The present invention solves this problem by providing a pure IP to SS7 conversion. The invention is particularly useful to provide a telecommunication network that uses TCP/IP protocols for message transport rather than SS7 protocols. The interface defined by the present invention can be used to connect nodes to SS7 networks without any knowledge of the SS7 protocols. The protocol used by this interface is called the Private Wireless Office Protocol (PWOP).

The Private Wireless Office Protocol

The private wireless office protocol (PWOP) provides a mechanism for transporting mobile application data messages, such as TCAP and MAP messages, over a network implementing the TCP and IP protocols. Messages containing mobile application data are referred to herein as mobile application messages (MAM). For purposes of this application, mobile application messages are application layer messages, such as MAP and TCAP messages, used in a mobile communication network. In the context of the present invention, a MAM includes all MAP and TCAP layer data. The present invention, however, is not limited to MAP and TCAP messages, but may be used with other application layer messages or user messages needed to exchange application data in a mobile communication system.

The PWOP is also used for communicating mobile application data over an interface between a host in the IP network and a gateway to an SS7 network. The gateway will be referred to herein as an SS7 gateway. The PWOP protocol resides between the transport layer (TCP) and the TCAP layer. An important feature of the protocol is that it avoids the need to implement SS7 protocols, particularly the SCCP protocol and lower level SS7 protocols.

Figure 6:
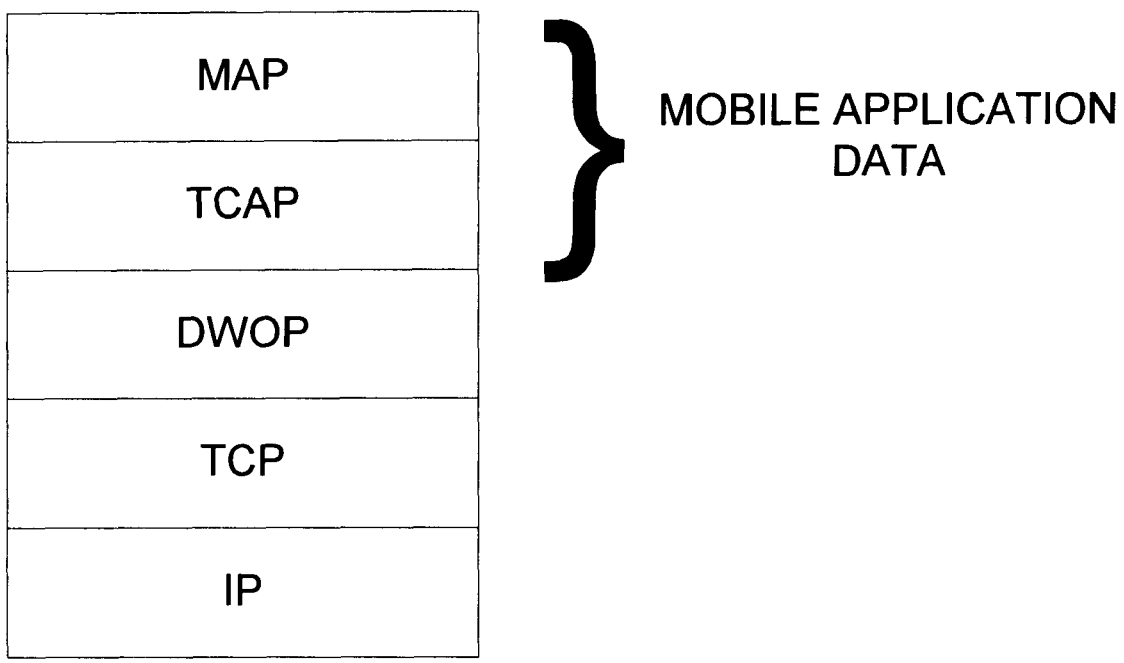
FIG. 6 is a schematic diagram showing the protocols used by the wireless office telephone system.

FIG. 6 is a diagram showing the relationship of the various protocols used in the wireless office telephone system WOTS. The WOTS uses the TCP and IP protocols to provide basic transport of messages over the IP network 12. Like the SS7 network 10, the TCAP protocol is used to communicate application layer data to between different applications in the WOTS or between an application in the WOTS and an application in the PLMN. PWOP is an adaptation protocol for establishing a communication session between the gateway and a node in the IP network and enabling MAP and TCAP messages to be transported using TCP/IP protocols. The PWOP protocol layer, sometimes generically referred to as the adaptation layer, lies between the transport layer (TCP) and the application layer (TCAP). The session management services provided by the PWOP layer are not implemented in the SS7 protocol.

TCP is a transport layer protocol concerned with the reliable delivery of data between processes running on different nodes of an IP network. The TCP protocol checks the integrity and completeness of data and ensures that the data is received in the proper sequence. The TCP protocol corresponds to the transport layer of the OSI Reference Model.

IP is a network layer protocol concerned with breaking messages into packets and routing of the packets. The IP layer corresponds to the network layer of the OSI Reference Model. One benefit of the IP protocol is that it is hardware independent, thereby allowing dissimilar networks to be interconnected as if they were one homogenous network. To perform the routing function, the IP protocol assigns a unique 32-bit address, called the IP address, to each host on the network. The IP address uniquely identifies a host. Thus, messages can be routed over the network by specifying the IP address of the destination host.

The PWOP is an adaptation layer protocol, which is described in more detail below. This protocol provides a vehicle for transporting mobile application data over TCP/IP. The functions performed at this layer include session management (opening, closing, and configuring a communications session) and link supervision. The session management functions are functions of the session layer in the OSI Reference Model. Link supervision is normally a function of layers 2 and 3 in the OSI Reference Model. However, the TCP/IP protocols lack the robustness of an SS7 network which has been developed specifically for telecommunications networks. Therefore, the link supervision functions are implemented at this level to monitor the communication link between the gateway and IP network. Link reestablishment in the event of a failure is also performed at this layer. The TCP/IP protocols are well known in the art and further description thereof is, therefore, not warranted.

The MAP and TCAP layers are the same as those used by the cellular network. It is necessary for the WOTS to implement these protocols to enable its users to roam seamlessly within the PLMN. The TCAP protocol is defined in ANSI T1.114-1998. The mobile application protocol (MAP) may be any protocol that is suitable for use on top of ANSI TCAP. For example, TIA/EIA-41-D defines a Mobile Application Protocol suitable for use with the present invention.

Figure 7:
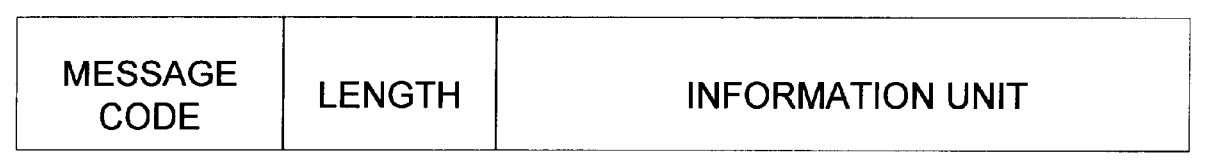

Two types of signaling messages are used in the PWOP protocol—network messages and session control messages. The basic structure of these messages is the same and is shown in FIG. 7. As seen in FIG. 7, each message includes a header comprising a Message Code information element and a Length information element. The header is followed by an Information Unit information element. The formats of the various session control and network messages are shown in Appendix A attached hereto. The information elements contained in the session control and network messages are shown in Appendix B.

Session control messages are sent over the gateway interface to establish and maintain communication between the SS7 gateway and a host in the IP network. ion control messages have the following structure:

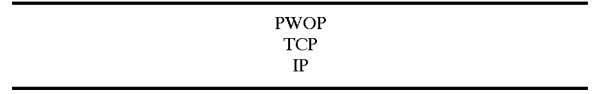

Network messages are used to transfer application-layer data between nodes in the IP network, and between a node in the network and the gateway. Network messages have the following structure:

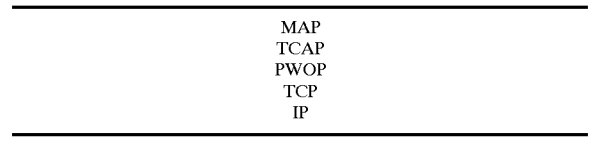

At the TCP layer, messages are addressed using the IP address and destination port of an entity in the IP network or the SS7 gateway. The PWOP protocol defines operation and maintenance (OM) procedures to establish and maintain communication between the SS7 gateway and a host in the IP network, or between two hosts in the IP network. It also defines procedures to close a communication session. The session control messages are used to carry out these OM procedures, which will be described more fully below.

The PWOP protocol also defines networking procedures for transporting mobile application data, such as MAP and TCAP messages over the interface. The mobile application data in the TCAP and MAP layers is transported unchanged across the interface. One of the functions defined by the protocol needed to perform seamless transfer of mobile application data is address conversion.

Operations and Maintenance Procedures

There are five basic OM procedures implemented by the PWOP protocol. The OM procedures implemented by the PWOP protocol include the open session procedure, the link supervision procedure, the link reestablishment procedure, the configuration procedure, and the close session procedure.

The open session procedure is used to initiate a session between the SS7 gateway and a host on the IP network. The link supervision procedure monitors the communication link and generates an alarm in the event of a link failure. The link reestablishment procedure is used to reestablish the link when a link failure occurs. The configuration procedure is used to configure a host in the IP network during a communication session. The close session procedure is used to terminate a communication session. These procedures are described in more detail below.

In general, the OM procedures are initiated by sending session control messages from the gateway 14 over the interface to an IP host. The timers and counters shown in Table 1 are used to implement these procedures:

TABLE 1

Timers and Counters Used in OM Procedures

| Name | Used By | Value Range | Description |
| --- | --- | --- | --- |
| T1 | GATEWAY | 1–255 | Time between consecutive Link Supervision messages |
| C1 | GATEWAY | 0–255 | Number of consecutive Link Supervision messages sent without acknowledgement |
| T2 | IP HOST | 1–255 | Time between consecutive Link Supervision messages |
| C2 | IP HOST | 0–255 | Number of consecutive times timer T2 has expired without receiving a Link Supervision message |
| T3 | GATEWAY | 1–255 | Time between consecutive Open Session messages during link reestablishment |
| T4 | GATEWAY | 0–5 | Maximum time to wait for a response to an O&M message |

All session control messages transmitted over the interface are acknowledged within a period defined by timer T4. If this timer expires before receiving the corresponding acknowledgment message, appropriate actions are taken as described below.

Open Session Procedure

The open session procedure is initiated by the gateway sending an Open Session message over the interface to an IP host. The Open Session message includes the following information elements: PWOP Version, SSL Version, Supervision Period, Keep Alive Periods, PCV Address information element, MSCID and MSCIN. The PWOP Version and SSL Version information elements are used to indicate the version of the PWOP protocol and SSL supported by the sending node. The Supervision Period information element indicates the time between two consecutive link supervision messages. The default value is 60 seconds. The PCV Address information element identifies the address of the SS7/IP protocol converter node. The Keep Alive Periods information element indicates the number of Supervision Periods that the IP host shall continue to operate without successful link supervision. The default value is 60. The MSCID information element indicates the identification number of the IP network. The MSCID information element is specified by the operator of the IP network. The MSCIN information element indicates the identification number of an MSC 28 in an SS7 network that is sending the message. The PWOP version, SSL version, Supervision Period, and Keep Alive Period information element may be specified by the operator of the IP network. If the operator does not specify these information elements, they shall be populated with their corresponding default values. The operator of the IP network can also specify the MSCID and MSCIN information elements. However, if these information elements are not specified, they are not included in the open session message.

Upon receipt of an open session message, a host on the IP host verifies whether it supports the required PWOP and SSL version and sends an Open Session Result message back to the gateway. The Open Session Result message includes the Open Session Result parameter. If the specified PWOP and SSL versions are not supported, the IP host sends an Open Session Result message over the interface to the gateway indicating that it does not support the specified versions. In this case, the Open Session Result messages will include the version of the PWOP protocol and SSL supported by the IP host. If the IP host supports the specified PWOP protocol and SSL, it shall respond with an Open Session Result message which will only include the Open Session Result information element and shall start timer T2 with the value specified in the Supervision Period information element.

When the gateway receives the Open Session Result message, and it indicates a successful connection, the gateway presents the results to the operator, starts timer T1, and allows traffic over the interface towards the IP network. If the connection is not made successfully, or no Open Session Result message is received, the gateway shall present the result to the operator.

Link Supervision Procedure

When timer T1 expires, the gateway sends a Link Supervision message over the interface to the IP network. The Link Supervision message is used to monitor the status of the link to the IP network as well as the status of the WOTS application. The Link Supervision message includes a single information element called the Unacknowledged Periods information element. This information element is populated with the value of the counter C1.

Upon receipt of a Link Supervision message, the IP host shall re-set counter C2, re-start timer T2, and send a Link Supervision Result message to the gateway. When the Link Supervision Result message is received by the gateway, counter C1 is re-set and timer T2 is re-started.

If the gateway does not receive a Link Supervision Result message, it increments counter C1 by one and re-starts timer T1. If counter C1 reaches a value equal to that specified in the Keep Alive Periods information element, the gateway shall stop all MAP messages from being transmitted over the interface, issue a link failure alarm, and initiate the link reestablishment procedure.

The timer T2 is used to indicate the length of time that the IP network shall continue transmitting without link supervision. If timer T2 expires, counter C2 is increased by one and timer T2 shall be re-started. When counter C2 reaches the value of the Keep Alive Periods information element, the IP host shall stop transmitting or receiving MAP message over the interface, stop all new call attempts, stop timer T2, and issue a link failure alarm. Established calls are not dropped. Rather, they shall be allowed to continue until they are ended by normal procedures.

Link Reestablishment Procedure

When link reestablishment is needed, as indicated by a link failure alarm, the gateway shall start timer T3. When timer T3 expires, the gateway sends an Open Session message containing only its mandatory information elements. If the communication is successfully established, the gateway shall stop timer T3, cease the link failure alarm, allow MAP messages to be transmitted over the gateway interface, and start timer T1. Otherwise, timer T3 is re-started.

When the IP host receives an Open Session message following a link failure alarm, it ceases any outstanding link failure alarm.

Configuration Procedure

The configuration procedure is used to change the configuration data at the IP host. A Configuration message is sent over the interface by the gateway to the IP host. The Configuration message may include the Supervision Period information element, the Keep Alive Periods information element, the MSCID information element, and the MSCIN information elements. At least one of these information is included. When the IP host receives a Configuration message, it updates the value of timer T2, re-starts timer T2, re-sets counter C2, and sends a Configuration Result message to the gateway. The Close Session Result message includes a Traffic Type information element. The Traffic Type information element indicates if messages and/or calls are to be stopped during a close session procedure. Upon receipt of the Configuration Result message, the gateway updates the value of timer T1, re-starts timer T1, and re-sets counter C1.

Close Session Procedure

The close session procedure is used to terminate a communication session. To terminate a communication session, the gateway sends a Close Session message over the interface to the IP host. Upon receipt of the Close Session message, the IP host stops all MAD messages transmitted to and from the gateway, stops all new call attempts (if indicated by information element Traffic Type, stops timer T2, issues a session closed alarm, and sends a Close Session Result message to the gateway. The Close Session Result message includes a Traffic Type information element. The Traffic Type information element indicates if messages and/or calls are to be stopped during a Close Session procedure. By default, all messages and calls are stopped. This default behavior can be modified so that messages are stopped but the call continues until it is terminated. When the gateway receives the Close Session Result message, it presents the result to the operator, stops timer T1, and stops all traffic toward the network. If the Close Session Result message is not received, it shall also stop traffic toward the network and present the result to the operator.

Networking Procedures

The procedures used to transport mobile application data over the gateway interface are referred to herein as networking procedures. The networking procedures transport the mobile application data unchanged over the interface to and from the SS7 network. The interface handles address translation of the message as described below. The mobile application data is contained in a message called the mobile application message (MAM). The MAM includes three information elements—the Calling Party Address information element, the Called Party Address information element, and the Mobile Application Data (MAD) information element. The Calling Party Address information element is an optional information element containing the address of the calling party. The address may be in any of the forms shown in Appendix B. The Called Party Address information element is a mandatory information element containing the address of the called party. The address in the Calling Party Address information element and the Called Party Address information element can be in the formats shown in Appendix B. The permitted formats include the ANSI SS7 format (point code and subsystem number), the ITU SS7 format (signaling point code and subsystem number), global title, or IP address. The addresses are translated as needed by the gateway. The MAD information element contains application data, such Address Translation of Incoming Messages from the SS7 Network The term "incoming messages" indicates messages coming into the gateway from the SS7 network. When the gateway receives a message from the SS7 network that is addressed to a host in the IP network, it takes the called party address information from the SCCP layer and translates it to an IP address. The IP address is included in the Called Party Address information element of the MAM.

To perform the translation of address information contained in an SS7 message into an IP message, the gateway has tables to translate a destination point code (DPC) and, optionally, a subsystem number (SSN) to a corresponding IP address for a host on the IP network, and to translate a global title (GT) and translation type (TT) to the IP address of a host. Also, the calling party address information from the SCCP layer is included in the calling party address information element of the MAM.

When an IP host receives the incoming message, it shall take the appropriate action according to the information in the TCAP and MAP layers Address Translation of Outgoing Messages Outgoing messages are messages transmitted over the interface from a host on the IP network to the gateway which are to be transferred to the SS7 network. When the gateway receives an outgoing message from the IP host, it takes the Called Party Address information element of the MAM and uses it to populate the Called Party Address information element n the SCCP layer of the SS7 message. Also, the gateway takes the source IP address from the IP layer, translates it into a point code and SSN, and uses it to populate the Calling Party Address information element in the SSCP layer of the SS7 message.

When a network entity sends a MAM, it populates the Called Party Address information element differently, depending on whether the network entity is responding to a previously received MAM, or is originating the message. If the IP host is sending an answer or response to a previously received MAM, it shall use the information received in the Calling Party Address information element of the incoming MAM to populate the Called Party Address information element of the outgoing MAM. If the IP host is originating the message, it shall populate the Called Party Address information element with the global title and translation type of the intended destination. The calling party address information element is not included in the outgoing MAM.

The conversion procedures are handled by the protocol converter 16 at the gateway 14. As shown in FIG. 1, the protocol converter 16 interfaces with an SCCP module 15 on the SS7 side of the gateway and a PWOP module 17 on the IP side of the gateway 14. The SCCP module 15 retrieves signals from the MTP module 17 and forwards the signals to the converter 16. Similarly, the DWOP module 17 retrieves signals from the TCP module 18 and forwards them to the converter 16. The converter 16 extracts addressing information from the SCCP and TCP layers. In messages transmitted from the SS7 network to the IP network, the addressing information from the SCCP layer is used to populate the address parameters in the DWOP layer of the outgoing message. In messages transmitted from the IP network to the SS7 network, the addressing information from the DWOP layer is used to populate the address parameters in the SCCP layer of the outgoing message. During the conversion process, all application layer data, including TCAP and MAP data, are transported transparently through the converter 16.

The present invention defines a relatively simple protocol for transporting ANSI-41 messages over a pure TCP/IP network. One benefit of this protocol is that it does not require hosts in the IP network to have knowledge of SS7 protocols or procedures. in particular, the present invention eliminates the need for the SCCP layer protocols typically found in SS7 networks. Thus, the present invention provides a relatively simple and reliable method for interfacing a pure IP network with an SS7 network.

APPENDIX A

Message Formats

| Field | VALUE (HEX) | TYPE |
|---|---|---|
| Open Session Message | | |
| Message Code | 01 | M |
| Length | variable octets | M |
| Information Unit | | |
| DWOP Version | | M |
| SSL Version | | M |
| Supervision Period | | M |
| Keep Alive Periods | | M |
| PCV Address | | M |
| MSCID | | O |
| MSCIN | | O |
| Open Session Result Message | | |
| Message Code | 81 | M |
| Length | variable octets | M |
| Information Unit | | |
| Open Session Result | | M |
| DWOP Version | | O |
| SSL Version | | O |
| Close Session Message | | |
| Message Code | 02 | M |
| Length | 0 octets | M |
| Information Unit | | |
| Empty | | |
| Close Session Result Message | | |
| Message Code | 82 | M |
| Length | 1 octet | M |
| Information Unit | | |
| Traffic Type | | M |
| Configuration Message | | |
| Message Code | 03 | M |
| Length | variable octets | M |
| Information Unit | | |
| Supervision Period | | O |
| Keep Alive Periods | | O |
| MSCID | | O |
| MSCIN | | O |
| Note: at least one of the optional parameters shall be included | | |
| Configuration Result Message | | |
| Message Code | 83 | M |
| Length | 0 octets | M |
| Information Unit | | |
| Empty | | |
| Link Supervision Message | | |
| Message Code | 04 | M |
| Length | 1 octet | M |
| Information Unit | | |
| Unacknowledged Periods | | O |
| Link Supervision Result Message | | |
| Message Code | 84 | M |
| Length | 0 octets | M |

APPENDIX A-continued

Message Formats

| Field | VALUE (HEX) | TYPE |
|---|---|---|
| Information Unit | | |
| Empty | | |
| Mobile Application Message (MAM) | | |
| Message Code | 05 | M |
| Length | variable octets | M |
| Information Unit | | |
| Calling Party Address | | O |
| Called Party Address | | M |
| MAD Message | | M |

APPENDIX B

Information Elements
Called Party Address Information Element

Called Party Address using ANSI SS7

| Field | Value (hex) | Type | Reference | Notes |
|---|---|---|---|---|
| Identifier | 82 | M | | |
| Length | 5 octets | M | | |
| Information Unit | | | | |

| H | G | F | E | D | C | B | A | octet | NOTES |
|---|---|---|---|---|---|---|---|---|---|
| Spare | | | Type of Address | | | | | 1 | a |
| Point Code - Member Number | | | | | | | | 2 | |
| Point Code - Cluster Number | | | | | | | | 3 | |
| Point Code - Network Number | | | | | | | | 4 | |
| Subsystem Number (SSN) | | | | | | | | 5 | |

Notes:
a Type of Address shall be set to ANSI SS7 Point Code.

Called Party Address using ITU SS7

| Field | Value (hex) | Type | Reference | Notes |
|---|---|---|---|---|
| Identifier | 82 | M | | |
| Length | 5 octets | M | | |
| Information Unit | | | | |

| H | G | F | E | D | C | B | A | octet | NOTES |
|---|---|---|---|---|---|---|---|---|---|
| Spare | | | Type of Address | | | | | 1 | a |
| MSB | | Signaling Point Code | | | | | | 2 | |
| Spare | | | | | | | LSB | 3 | |
| Subsystem Number (SSN) | | | | | | | | 4 | |

Notes:
a Type of Address shall be set to ITU SS7 Point Code.

Called Party Address using Global Title

| Field | Value (hex) | Type | Reference | Notes |
|---|---|---|---|---|
| Identifier | 82 | M | | |
| Length | m variable octets | M | | a |
| Information Unit | | | | |

| H | G | F | E | D | C | B | A | octet | NOTES |
|---|---|---|---|---|---|---|---|---|---|
| Spare | | | Type of Address | | | | | 1 | b |
| Translation Type (TT) | | | | | | | | 2 | |
| Number of Digits | | | | | | | | 3 | |
| $2^{nd}$ digit | | | $1^{st}$ digit | | | | | 4 | c |
| $4^{th}$ digit | | | $3^{rd}$ digit | | | | | 5 | |
| ... | | | ... | | | | | ... | |
| $n^{th}$ digit | | | $n-1^{th}$ digit | | | | | m | cd |

Notes:
a Where m = 3 + [(Number of Digits)/2, rounded up to an integer].
b Type of Address shall be set to Global Title.
c Digits are coded in BCD.
d When there is an odd number of digits the $n^{th}$ digit is set to zero.

APPENDIX B-continued

Information Elements
Called Party Address Information Element

Called Party Address using IP Address

| Field | Value (hex) | Type | Reference | Notes |
|---|---|---|---|---|
| Identifier | 82 | M | | |
| Length | 5 octets | M | | |
| Information Unit | | | | |

| H | G | F | E | D | C | B | A | octet | NOTES |
|---|---|---|---|---|---|---|---|---|---|
| | Spare | | | Type of Address | | | | 1 | a |
| MSB | | | | | | | | 2 | |
| | | | | | | | | 3 | |
| | | | IP Address | | | | | 4 | |
| | | | | | | | LSB | 5 | |

Notes:
a Type of Address shall be set to IP Address.

Calling Party Address using ANSI SS7

| Field | Value (hex) | Type | Reference | Notes |
|---|---|---|---|---|
| Identifier | 81 | M | | |
| Length | 5 octets | M | | |
| Information Unit | | | | |

| H | G | F | E | D | C | B | A | octet | NOTES |
|---|---|---|---|---|---|---|---|---|---|
| | Spare | | | Type of Address | | | | 1 | a |
| | | Point Code - Member Number | | | | | | 2 | |
| | | Point Code - Cluster Number | | | | | | 3 | |
| | | Point Code - Network Number | | | | | | 4 | |
| | | Subsystem Number (SSN) | | | | | | 5 | |

Notes:
a Type of Address shall be set to ANSI SS7 Point Code.

Calling Party Address using ITU SS7

| Field | Value (hex) | Type | Reference | Notes |
|---|---|---|---|---|
| Identifier | 81 | M | | |
| Length | 5 octets | M | | |
| Information Unit | | | | |

| H | G | F | E | D | C | B | A | octet | NOTES |
|---|---|---|---|---|---|---|---|---|---|
| | Spare | | | Type of Address | | | | 1 | a |
| MSB | | | Signaling Point Code | | | | | 2 | |
| Spare | | | | | | | LSB | 3 | |
| | | Subsystem Number (SSN) | | | | | | 4 | |

Notes:
a Type of Address shall be set to ITU SS7 Point Code.

Calling Party Address using Global Title

| Field | Value (hex) | Type | Reference | Notes |
|---|---|---|---|---|
| Identifier | 81 | M | | |
| Length | m variable octets | M | | a |
| Information Unit | | | | |

| H | G | F | E | D | C | B | A | octet | NOTES |
|---|---|---|---|---|---|---|---|---|---|
| | Spare | | | Type of Address | | | | 1 | b |
| | | Translation Type (TT) | | | | | | 2 | |
| | | Number of Digits | | | | | | 3 | |
| | 2$^{nd}$ digit | | | 1$^{st}$ digit | | | | 4 | c |
| | 4$^{th}$ digit | | | 3$^{rd}$ digit | | | | 5 | |
| | ... | | | ... | | | | ... | |
| | n$^{th}$ digit | | | n-1$^{th}$ digit | | | | m | cd |

Notes:
a Where m = 3 + [(Number of Digits)/2, rounded up to an integer].
b Type of Address shall be set to Global Title.
c Digits are coded in BCD.
d When there is an odd number of digits, the n$^{th}$ digit is set to zero.

Calling Party Address using IP Address

| Field | Value (hex) | Type | Reference | Notes |
|---|---|---|---|---|
| Identifier | 81 | M | | |
| Length | 5 octets | M | | |
| Information Unit | | | | |

| H | G | F | E | D | C | B | A | octet | NOTES |
|---|---|---|---|---|---|---|---|---|---|
| | Spare | | | Type of Address | | | | 1 | a |
| MSB | | | | | | | | 2 | |
| | | | | | | | | 3 | |
| | | | IP Address | | | | | 4 | |
| | | | | | | | LSB | 5 | |

Notes:
a Type of Address shall be set to IP Address.

DWOP Version Information Element

| Field | Value (hex) | Type | Reference | Notes |
|---|---|---|---|---|
| Identifier | 03 | M | | |
| Length | 1 octet | M | | |
| Information Unit | | | | |

| H | G | F | E | D | C | B | A | octet | NOTES |
|---|---|---|---|---|---|---|---|---|---|
| | Spare | | | DWOP Version | | | | 1 | |

Keep Alive Periods Information Element

| Field | Value (hex) | Type | Reference | Notes |
|---|---|---|---|---|
| Identifier | 0A | M | | |
| Length | 1 octet | M | | |
| Information Unit | | | | |

| H | G | F | E | D | C | B | A | octet | NOTES |
|---|---|---|---|---|---|---|---|---|---|
| | | Number of Supervision Periods | | | | | | 1 | a |

Note:
a Value range 1–255.

Mobile Application Data Information Element

| Field | Value (hex) | Type | Reference | Notes |
|---|---|---|---|---|
| Identifier | 83 | M | | |
| Length | m octets | M | | a |
| Information Unit | | | | |

| H | G | F | E | D | C | B | A | octet | NOTES |
|---|---|---|---|---|---|---|---|---|---|
| | | | | | | | | 1 | b |
| | | | | | | | | 2 | |
| | | | Mobile Application Data | | | | | ... | |
| | | | | | | | | m | |

Notes:
a Where m = length of the MAP message including the TCAP heading.
b Includes the MAP message and the TCAP heading.

MSCID Information Element

| Field | Value (hex) | Type | Reference | Notes |
|---|---|---|---|---|
| Identifier | 04 | M | | |
| Length | 3 octets | M | | |
| Information Unit | | | | |

| H | G | F | E | D | C | B | A | octet | NOTES |
|---|---|---|---|---|---|---|---|---|---|
| MSB | | | | | | | | 1 | a |
| | | | MSC Identify | | | | | 2 | |
| | | | | | | | LSB | 3 | |

Note:
a The MSC Identity is specified by the service provider.

MSCIN Information Element

| Field | Value (hex) | Type | Reference | Notes |
|---|---|---|---|---|
| Identifier | 05 | M | | |
| Length | m variable octets | M | | a |

APPENDIX B-continued

Information Elements
Called Party Address Information Element

Information Unit

| H | G | F | E | D | C | B | A | octet | NOTES |
|---|---|---|---|---|---|---|---|-------|-------|
| | | | Number of Digits | | | | | 1 | b |
| | 2nd digit | | | | 1st digit | | | 2 | c |
| | 4th digit | | | | 3rd digit | | | 3 | |
| | ... | | | | ... | | | ... | |
| | nth digit | | | | n-1th digit | | | m | cd |

Notes:
a Where m = 1 + [(Number of Digits)/2, rounded up to an integer].
b The Number of Digits is between 0 and at least 15.
c Digits are coded in BCD.
d When there is an odd number of digits, the nth digit is set to zero.

Open Session Result Information Element

| Field | Value (hex) | Type | Reference | Notes |
|-------|-------------|------|-----------|-------|
| Identifier | 07 | M | | |
| Length | 1 octet | M | | |

Information Unit

| H | G | F | E | D | C | B | A | octet | NOTES |
|---|---|---|---|---|---|---|---|-------|-------|
| | | | Open Session Result | | | | | 1 | |

PVC Address Information Element

| Field | Value (hex) | Type | Reference | Notes |
|-------|-------------|------|-----------|-------|
| Identifier | 0B | M | | |
| Length | 5 octets | M | | |

Information Unit

| H | G | F | E | D | C | B | A | octet | NOTES |
|---|---|---|---|---|---|---|---|-------|-------|
| | Spare | | | | Type of Address | | | 1 | a |
| MSB | | | | | | | | 2 | |
| | | | | | | | | 3 | |
| | | | IP Address | | | | | 4 | |
| | | | | | | | LSB 5 | | |

Note:
a The Type of Address shall be set to IP Address.

SSL Version Information Element

| Field | Value (hex) | Type | Reference | Notes |
|-------|-------------|------|-----------|-------|
| Identifier | 02 | M | | |
| Length | 1 octet | M | | |

Information Unit

| H | G | F | E | D | C | B | A | octet | NOTES |
|---|---|---|---|---|---|---|---|-------|-------|
| | Spare | | | | SSL Version | | | 1 | |

Supervision Period Information Element

| Field | Value (hex) | Type | Reference | Notes |
|-------|-------------|------|-----------|-------|
| Identifier | 08 | M | | |
| Length | 1 octet | M | | |

Information Unit

| H | G | F | E | D | C | B | A | octet | NOTES |
|---|---|---|---|---|---|---|---|-------|-------|
| | | | Supervision Time | | | | | 1 | a |

Note:
a Value range 1–255 seconds.

Traffic Type Information Element

| Field | Value (hex) | Type | Reference | Notes |
|-------|-------------|------|-----------|-------|
| Identifier | 0C | M | | |
| Length | 1 octet | M | | |

Information Unit

| H | G | F | E | D | C | B | A | octet | NOTES |
|---|---|---|---|---|---|---|---|-------|-------|
| | Spare | | | | Traffic Type | | | 1 | |

APPENDIX B-continued

Information Elements
Called Party Address Information Element

Unacknowledged Periods Information Element

| Field | Value (hex) | Type | Reference | Notes |
|-------|-------------|------|-----------|-------|
| Identifier | 09 | M | | |
| Length | 1 octet | M | | |

Information Unit

| H | G | F | E | D | C | B | A | octet | NOTES |
|---|---|---|---|---|---|---|---|-------|-------|
| | | | Number of Unacknowledged Periods | | | | | 1 | a |

Note:
a Value range 1–255.

What is claimed is:

1. A method for communicating a mobile application message over an IP network between a first node in an SS7 network that uses SCCP for message transport and a second node in an IP network that uses TCP/IP for message transport comprising:
    (a) encapsulating said mobile application message in an IP message without intervening SS7 protocol layers; and
    (b) transmitting said IP protocol message containing said mobile application message from said first node to said second node via a gateway; and
    (c) periodically sending a link supervision message from said gateway to one of said first and second nodes to monitor the status of the communication link, said link supervision message comprising an Unacknowledged Periods information element.

2. The method according to claim 1 further including extracting said mobile application message from said IP protocol message at said second node.

3. A method for communicating a mobile application message between a first node in an SS7 network that uses SCCP for message transport and a second node in an IP network that uses TCP/IP for message transport, wherein said IP network and said SS7 network are connected by a gateway, said communicating method comprising:
    (a) receiving, at said gateway, an SS7 message containing said mobile application message and a SCCP transport layer from said first node in said SS7 network;
    (b) extracting said mobile application message from said SS7 message at said gateway;
    (c) encapsulating said mobile application message in an IP message without an intervening SCCP layer; and
    (d) routing said IP message containing said mobile application message toward said second node in said IP network; and
    (e) periodically sending a link supervision message from said gateway to said second node to monitor the status of the communication link, said link supervision message comprising an Unacknowledged Periods information element.

4. The method according to claim 3 wherein said SS7 message includes a called party address in said SCCP layer identifying the called party.

5. The method according to claim 4 further including the step of translating the called party address at the gateway from a first format into a routable IP address in said IP network.

6. The method according to claim 5 wherein said called party address comprises global title digits and said translating step comprises retrieving the IP address corresponding to said global title digits from a database.

7. The method according to claim 5 wherein said called party address includes a point code and optionally a subsystem number and said translating step comprises retrieving the IP address corresponding to said point code and subsystem number from a database.

8. A method for communicating a mobile application message between a first node in an IP network that uses TCP for message transport and a second node in an SS7 network that uses SCCP for message transport, wherein said IP network and said SS7 network are connected by a gateway, said communicating method comprising:
 (a) receiving, at said gateway, an IP message containing said mobile application message encapsulated in said IP message without an intervening SS7 protocol layer;
 (b) extracting said mobile application message from said IP protocol message at said gateway;
 (c) encapsulating said mobile application message in an SS7 message including a SCCP layer; and
 (d) routing said SS7 message containing said mobile application message toward said second node in said SS7 network; and
 (e) periodically sending a link supervision message from said gateway to said first node to monitor the status of the communication link, said link supervision message comprising an Unacknowledged Periods information element.

9. The method according to claim 8 wherein said SCCP layer includes a calling party address information element.

10. The method according to claim 9 wherein the gateway populates the calling party address information element with a point code identifying the first node.

11. The method according to claim 10 further including the step of translating the calling party address from an IP address provided by said first node into a point code.

12. The method according to claim 9 wherein the gateway populates the calling party address information element with global title digits.

13. The method according to claim 10 further including the step of translating the calling party address from an IP address provided by said first node into global titles.

14. A method for communicating a mobile application message between a first node in an SS7 network that uses SCCP for message transport and a second node in an IP network that uses TCP/IP for message transport, wherein said IP network and said SS7 network are connected by a gateway, said communicating method comprising:
 (a) receiving, at said gateway, a signaling message from said first node, said signaling message including an application layer containing said mobile application message and a SCCP layer containing a called party information element containing the address of said second node;
 (b) converting said signaling message into an IP protocol message suitable for transmission over said IP network, said converting step including removing said SCCP layer;
 (c) routing said converted signaling message towards said second node in said IP network; and
 (d) periodically sending a link supervision message from said gateway to said second node to monitor the status of the communication link, said link supervision message comprising an Unacknowledged Periods information element.

15. The method according to claim 14 further including the step of translating, at said gateway, the called party address from the SCCP layer into a routable IP address in said IP network.

16. The method according to claim 15 wherein said called party address comprises global title digits and said translating step comprises retrieving the IP address corresponding to said global title digits from a database.

17. The method according to claim 15 wherein said called party address includes a point code and optionally a subsystem number and said translating step comprises retrieving the IP address corresponding to said point code and subsystem number from a database.

18. A method for communicating a mobile application messages between a first node in an IP network that uses TCP for message transport and a second node in an SS7 network that uses SCCP for message transport, wherein said IP network and said SS7 network are connected by a gateway, said communicating method comprising:
 (a) receiving, at said gateway, a signaling message containing said mobile application message from said first node, said signaling message including a called party address information element containing the address of said second node in said SS7 network, wherein said signaling message includes said mobile application message encapsulated in an IP protocol message without an intervening SCCP layer;
 (b) converting said signaling message into an SS7 message suitable for transmission over said SS7 network, said converting step including the step of adding a SCCP layer to said signaling message;
 (c) routing said converted signaling message towards said second node in said SS7 network; and
 (d) periodically sending a link supervision message from said gateway to said first node to monitor the status of the communication link, said link supervision message comprising an Unacknowledged Periods information element.

19. The method according to claim 18 wherein said SCCP layer includes a calling party address information element.

20. The method according to claim 19 wherein the gateway populates the calling party address information element with a point code identifying the first node.

21. The method according to claim 20 further including the step of translating the calling party address from an IP address provided by said first node into a routable point code in said SS7 network.

22. The method according to claim 21 wherein the gateway populates the calling party address information element with global title digits.

23. The method according to claim 22 further including the step of translating the calling party address from an IP address provided by said first node into global title digits.

24. A gateway for communicating a signaling message between a first node in an IP network comprising:
 a) a TCP interface module for transmitting IP protocol messages to and receiving TCP/IP protocol messages from said TCP/IP network using a first message format;
 b) an SCCP interface module for transmitting signaling messages to and receiving signaling messages from said SS7 network using a second message format; and
 c) a protocol converter interfaced with both said TCP interface module and said SCCP interface module for converting messages received from either said IP network into SS7 messages and for converting messages from said SS7 network into the IP messages; and
 d) said gateway operable to periodically send a link supervision message to said first node to monitor the status of the communication link, said link supervision message comprising an Unacknowledged Periods information element.

25. The system according to claim 24 wherein the protocol converter converts SCCP address parameters from SS7 messages into IP address parameters used by said IP network.

26. The system according to claim 25 wherein said SCCP address parameters include a point code and optionally a subsystem number.

27. The system according to claim 25 wherein said SCCP address parameters include global title digits.

28. The system according to claim 25 wherein said gateway includes a database for storing IP addresses and corresponding SCCP address parameters used by said protocol converter to translate addresses.

29. A method for communicating a mobile application message an interface between a gateway to an SS7 network that uses SCCP for message transport and a host in an IP network that uses TCP/IP for message transport, said communicating method comprising:
 a) establishing a communication session between said gateway and said host;
 b) receiving, at said gateway, a mobile application message originating from said SS7 network, said mobile application message including a SCCP layer;
 c) extracting said mobile application message from said SS7 message at said gateway;
 d) encapsulating said mobile application message in an IP message without an intervening SCCP layer; and
 e) routing said IP message containing said mobile application message toward said IP network; and
 f) periodically sending a link supervision message from said gateway to said IP host to monitor the status of the communication link.

30. The method according to claim 29 including sending a link supervision reply message from said host to said gateway in response top to said link supervision message.

31. The method according to claim 29 including generating a link failure signal by said gateway when a predetermined number of consecutive link supervision messages are sent without a response from said host.

32. The method according to claim 31 including generating a link failure signal by said host when a predetermined time period has elapsed without a link supervision message being received from said gateway.

33. A method for communicating a mobile application message an interface between a gateway to an SS7 network that uses SCCP for message transport and a host in an IP network that uses TCP/IP for message transport, said communicating method comprising:
 a) establishing a communication session between said gateway and said host;
 b) receiving, at said gateway, an IP message including a mobile application message originating from said IP network;
 c) extracting said mobile application message from said IP message at said gateway;
 d) encapsulating said mobile application message in an SS7 message including an SCCP layer; and
 e) routing said SS7 message containing said mobile application message toward said SS7 network; and
 f) periodically sending a link supervision message from said gateway to said IP host to monitor the status of the communication link.

34. The method according to claim 33 including sending a link supervision reply message from said host to said gateway in response top said link supervision message.

35. The method according to claim 33 including generating a link failure signal by said gateway when a predetermined number of consecutive link supervision messages are sent without a response from said host.

36. The method according to claim 35 including generating a link failure signal by said host when a predetermined time period has elapsed without a link supervision message being received from said gateway.

37. A gateway for communicating a signaling message between a first node in an IP network and a second node in an SS7 network, comprising:
 a) a TCP interface module for transmitting IP protocol messages to and receiving TCP/IP protocol messages from said IP network using a first message format;
 b) an SCCP interface module for transmitting signaling messages to and receiving signaling messages from said SS7 network using a second message format;
 c) a protocol converter interfaced with both said TCP interface module and said SCCP interface module for converting messages received from said IP network into SS7 messages and for converting messages received from said SS7 network into IP messages;
 d) an adaptation module between said TCP interface module and said protocol converter, said adaptation module performing link supervision functions comprising a link supervision procedure to monitor communications links between said gateway and said first node; and
 said link supervision procedure comprising an Unacknowledged Periods information element.

38. The system according to claim 37 characterized in that said adaptation module additionally performs session management functions selected from the group consisting of an open session procedure, a configuration procedure, and a close session procedure.

39. The system according to claim 38 characterized in that said open session procedure is operative to initiate a communication session over said gateway, and comprises elements selected from the group comprising of PWOP Version, SSL Version, Supervision Period, Keep Alive Period, PCV Address information element, MSCID and MSCIN.

40. The system according to claim 39 characterized in that said open session procedure includes said Supervision Period element, and said Supervision Period element indicates the time between successive link supervision messages.

41. The system according to claim 40 characterized in that said open session procedure additionally includes said Keep Alive Period element, and said Keep Alive Period element indicates the number of said Supervision Periods that said first node shall continue to operate without successful link supervision.

42. The system according to claim 38 characterized in that said configuration procedure is operative to change configuration data at said first node, and comprises elements selected from the group comprising of Supervision Period, Keep Alive Period, MSCID and MSCIN.

43. The system according to claim 38 characterized in that said close session procedure is operative to terminate a communications session, and includes a Traffic Type information element.

44. The system according to claim 37 characterized in that said link supervision functions of said adaptation module further comprises a link reestablishment procedure.

45. The system according to claim 44 characterized in that said link reestablishment procedure is operative to reestablish failed communications links between said gateway and said first node.

* * * * *